United States Patent
Kotani et al.

(10) Patent No.: US 7,265,528 B2
(45) Date of Patent: Sep. 4, 2007

(54) HIGH-FREQUENCY POWER APPARATUS

(75) Inventors: Hiroyuki Kotani, Osaka (JP); Hirotaka Takei, Osaka (JP)

(73) Assignee: Daihen Corporation, Osaka (JP)

( * ) Notice: Subject to any disclaimer, the term of this patent is extended or adjusted under 35 U.S.C. 154(b) by 0 days.

(21) Appl. No.: 11/467,229

(22) Filed: Aug. 25, 2006

(65) Prior Publication Data

US 2007/0047271 A1    Mar. 1, 2007

(30) Foreign Application Priority Data

Aug. 31, 2005 (JP) .............................. 2005-252880

(51) Int. Cl.
*G05F 1/40* (2006.01)
(52) U.S. Cl. ...................... 323/285; 323/284; 323/286; 363/16
(58) Field of Classification Search ................. 363/16; 323/271, 275, 280, 284, 285, 286, 351, 901
See application file for complete search history.

(56) References Cited

U.S. PATENT DOCUMENTS

| | | | |
|---|---|---|---|
| 6,194,885 B1 * | 2/2001 | Oshima ...................... | 323/285 |
| 7,106,031 B2 * | 9/2006 | Hayakawa et al. ......... | 323/285 |
| 7,129,679 B2 * | 10/2006 | Inaba et al. ................. | 323/901 |
| 7,221,129 B2 * | 5/2007 | Matsuo et al. .............. | 323/284 |
| 2005/0259450 A1 | 11/2005 | Kotani et al. | |
| 2006/0220573 A1 | 10/2006 | Kotani et al. | |

FOREIGN PATENT DOCUMENTS

| JP | 2001197749 | 7/2001 |
|---|---|---|
| JP | 2004240880 | 8/2004 |
| JP | 2004320418 | 11/2004 |

OTHER PUBLICATIONS

English language Abstract of JP 2001-197749.
English language Abstract of JP 2004-240880.
English language Abstract of JP 2004-320418.

* cited by examiner

*Primary Examiner*—Jessica Han
(74) *Attorney, Agent, or Firm*—Greenblum & Bernstein P.L.C.

(57) ABSTRACT

A high-frequency power apparatus including: an oscillator, outputting an oscillating signal, an output level of the oscillating signal being variable; an amplifier, amplifying the oscillating signal output from the oscillator and outputting high-frequency power; a DC power supply, supplying DC power to the amplifier, an output level of the DC power being variable; a high-frequency power measuring unit, measuring a power value of the high-frequency power at an output terminal of the high-frequency power apparatus and outputting the measured power value as a high-frequency power measured value; a DC power measuring unit, measuring a power value of the DC power supplied to the amplifier and outputting the measured DC power value as a DC power measured value; a first controller, controlling the output level of the oscillating signal to be output from the oscillator such that the high-frequency power measured value is substantially equal to an output power set value; and a second controller, controlling the output level of the DC power to be supplied from the DC power supply to the amplifier such that a calculated value obtained by dividing the high-frequency power measured value by the DC power measured value is substantially equal to a predetermined efficiency set value.

6 Claims, 9 Drawing Sheets

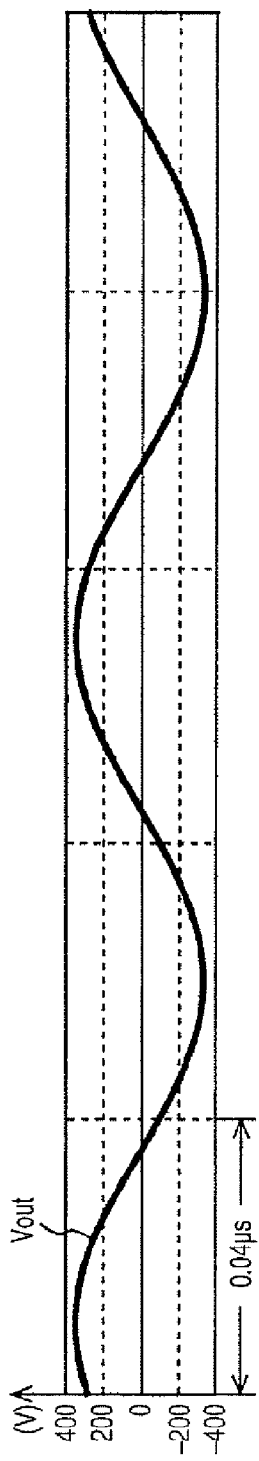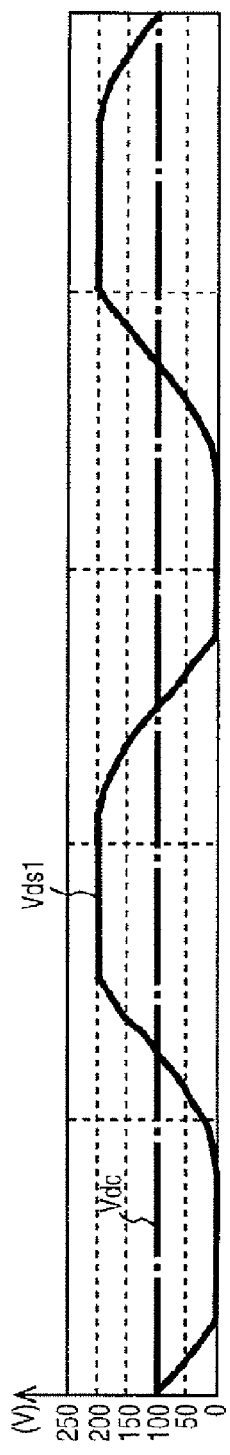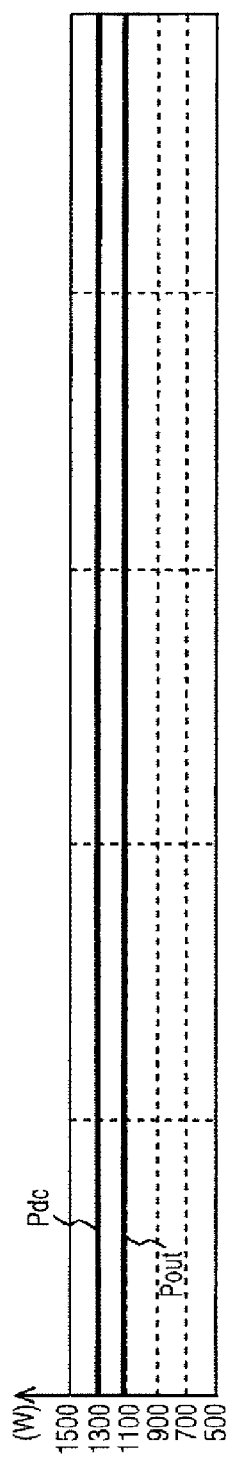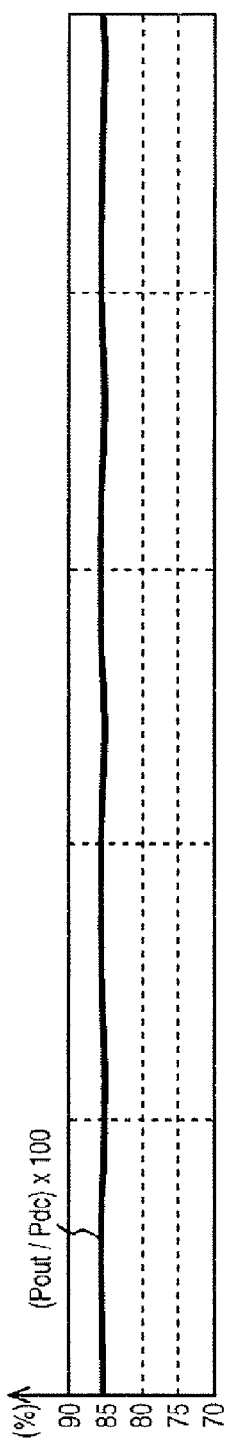
FIG. 7A
FIG. 7B
FIG. 7C
FIG. 7D

HIGH-FREQUENCY POWER APPARATUS

BACKGROUND OF THE INVENTION

1. Technical Field of the Invention

The present invention relates to a high-frequency power apparatus for supplying power to a load, such as a plasma processing device that performs, for example, plasma etching and plasma CVD.

2. Description of the Related Art

For example, a high-frequency power apparatus disclosed in JP-A-2001-197749 has been proposed. FIG. 9 is a block diagram illustrating the structure of a high-frequency power apparatus 50 according to the related art disclosed in JP-A-2001-197749.

The high-frequency power apparatus 50 includes an output power setting unit 51 for setting an output power value of high-frequency power, an oscillator 53 that varies the output level of an oscillating signal on the basis of a controls signal output from an output power controller 52, which will be described later, an amplifier 54 that amplifies the oscillating signal output from the oscillator 53 to output high-frequency power, an output power measuring unit 55 that measures the high-frequency power output from the amplifier 54, and the output power controller 52 that compares the output power value set by the output power setting unit 51 with the value measured by the output power measuring unit 55, provides error information of both the values to the oscillator 53, and controls the high-frequency power to be constant.

The high-frequency power apparatus 50 further includes: a DC power supply 58 that supplies to the amplifier DC power having an output level corresponding to an instruction value of a DC power controller 57, which will be described later; a DC power measuring unit 59 that measures a voltage value Vdc (hereinafter, referred to as a DC power supply voltage Vdc) of the DC power supplied from the DC power supply 58 to the amplifier 54 and outputs the measure voltage value as a DC voltage measured value Vdc (for the convenience, which has the same symbol Vdc as that of the DC power supply voltage Vdc); a DC voltage calculator 56 that calculates a set value Vset (hereinafter, referred to as a DC voltage set value Vset) of the DC power supply voltage Vdc corresponding to the output power value set by the output power setting unit 51, on the basis of a predetermined characteristic graph or characteristic function, such that the waveform of an output voltage Vds1 of an amplifying element, which is a component of the amplifier 54, is not distorted and the waveform of the output voltage has the maximum amplitude; and the DC power controller 57 that outputs a control signal for controlling the DC power supply 58 such that the DC voltage measured value Vdc output from the DC voltage measuring unit 59 is equal to the DC voltage set value Vset output from the DC voltage calculator 56.

In general, the output signal of the amplifying element, which is a component of the amplifier 54, is output through a transformer provided in the rear stage of the amplifying element.

According to the above-mentioned structure, it is possible to perform control such that the value of the high-frequency power supplied to the load is equal to the output power set value and to reduce the loss of the amplifier 54 in the range in which waveform distortion does not occur in a voltage component thereinafter, referred to as a high-frequency voltage) of the high-frequency power supplied from the amplifier 54. Thus, it is possible to improve the efficiency of conversion from DC power to high-frequency power.

The above will be described in detail below with reference to FIG. 10.

FIGS. 10A to 10C are diagrams illustrating an output voltage Vds1 of the amplifying element, which is a component of the amplifier, and the DC power supply voltage Vdc when the high-frequency power apparatus 50 according to the related art is used. FIG. 10A shows a high-frequency power value having a low level that is output from the amplifier 54. FIG. 10B shows a high-frequency power value having an intermediate level that is output from the amplifier 54. FIG. 10C shows a high-frequency power value having a high level that is output from the amplifier 54. In FIGS. 10A to 10C, a waveform that is symmetric to a positive half waveform of the output voltage Vds1 of the amplifying element with respect to the line of the DC power supply voltage Vdc is represented by a dotted line.

As shown in FIGS. 10A to 10C, in the related art, the amplitude of the output voltage Vds1 of the amplifying element varies corresponding to the high-frequency power value output from the amplifier 54, and the magnitude of the DC power supply voltage Vdc is about half the amplitude of the output voltage Vds1 of the amplifying element, which causes the minimum value of the output voltage Vds1 of the amplifying element to be approximately 0 V. Therefore, wave distortion does not occur in the output voltage Vds1, and it is possible to increase the amplitude of the output voltage Vds1 of the amplifying element to the maximum.

As described above, in general, the output of the amplifying element, which is a component of the amplifier 54, is transmitted through a transformer provided in the rear stage of the amplifying element. Therefore, the components of the DC power supply voltage Vdc are removed, and thus the output voltage of the amplifier 54 has an AC waveform without waveform distortion around 0 V.

In FIGS. 10A to 10C, the area of a hatched portion indicates the degree of loss. That is, as the area of the hatched portion is smaller, power loss in the amplifier becomes smaller, and thus conversion efficiency is improved. As can be seen from the waveform diagrams of the DC power voltage Vdc shown in FIGS. 10A and 10C, although the area of the hatched potion does not directly indicate the amount of power loss, the larger the area of the hatched portion becomes, the larger the amount of power loss becomes. That is, when the magnitude of the DC power supply voltage Vdc is set to be about half the amplitude of the output voltage Vds1 of the amplifying element in the range in which no distortion occurs in the waveform of the output voltage Vds1 of the amplifying element, which is a component of the amplifier, it is possible to improve the conversion efficiency to the maximum.

In the high-frequency power apparatus according to the related art, when the amplifier 54 is formed of a push-pull amplifying circuit, the conversion efficiency, which is represented by the ratio of the high-frequency power output from the amplifier 54 to the DC power supplied from the DC power supply 58 to the amplifier 54 (=high-frequency power/DC power), has a substantially constant value of 78%.

The high-frequency power apparatus according to the related art improves the conversion efficiency, thereby reducing energy consumption. However, in order to prevent global warming, in recent years, a further reduction in energy consumption has been needed.

Further, in the high-frequency power apparatus according to the related art, in order to obtain specific conversion efficiency, it is necessary to perform an operation of previously establishing the relationship between the output power set value and the output level of the DC power supply. However, in this case, the operation should be performed on every high-frequency power apparatus, which results in an increase in the number of operations.

SUMMARY OF THE INVENTION

The invention is made in view of the above-mentioned problem, and it is an object of an embodiment of the invention to provide a high-frequency power apparatus capable of performing control such that the value of high-frequency power supplied to a load is equal to an output power set value and of improving the conversion efficiency of an amplifier from DC power to high-frequency power. In addition, it is another object of the embodiment of the invention to provide a high-frequency power apparatus capable of further improving the convenience of use, as compared with a high-frequency power apparatus according to the related art, by previously establishing the relationship between the output power set value and the output level of a DC power supply.

According to a first aspect of the invention, there is provided a high-frequency power apparatus comprising:

an oscillator, outputting an oscillating signal, an output level of the oscillating signal being variable;

an amplifier, amplifying the oscillating signal output from the oscillator and outputting high-frequency power;

a DC power supply, supplying DC power to the amplifier, an output level of the DC power being variable;

a high-frequency power measuring unit, measuring a power value of the high-frequency power at an output terminal of the high-frequency power apparatus and outputting the measured power value as a high-frequency power measured value;

a DC power measuring unit, measuring a power value of the DC power supplied to the amplifier and outputting the measured DC power value as a DC power measured value;

a first controller, controlling the output level of the oscillating signal to be output from the oscillator such that the high-frequency power measured value is substantially equal to an output power set value; and a second controller, controlling the output level of the DC power to be supplied from the DC power supply to the amplifier such that a calculated value obtained by dividing the high-frequency power measured value by the DC power measured value is substantially equal to a predetermined efficiency set value.

According to the above-mentioned aspect, preferably, the high-frequency power apparatus further includes a filter provided between the amplifier and the high-frequency power measuring unit and adapted to remove harmonics.

In the high-frequency power apparatus according to the above-mentioned aspect, it is preferable that the DC power supply vary the output voltage to change the output level of the DC power. Further, according to a second aspect of the invention, there is provided a high-frequency power apparatus comprising:

an oscillator, outputting an oscillating signal, an output level of the oscillating signal being variable;

an amplifier, amplifying the oscillating signal output from the oscillator and outputting high-frequency power;

a DC power supply, supplying DC power to the amplifier, an output level of the DC power being variable;

a high-frequency power measuring unit, measuring a power value of the high-frequency power at an output terminal of the high-frequency power apparatus and outputting the measured power value as a first high-frequency power measured value and measuring a power value of a high-frequency power corresponding to power on a side of a load obtained by subtracting a reflected wave power from a forward wave power and outputting the measured power value as a second high frequency power measured value;

a DC power measuring unit, measuring a power value of the DC power supplied to the amplifier and outputting the measured DC power value as a DC power measured value;

a first controller, controlling the output level of the oscillating signal to be output from the oscillator such that the second high-frequency power measured value is substantially equal to an output power set value; and a second controller, controlling the output level of the DC power to be supplied from the DC power supply to the amplifier such that a calculated value obtained by dividing the first high-frequency power measured value by the DC power measured value is substantially equal to a predetermined efficiency set value.

According to the above-mentioned aspect, preferably, the high-frequency power apparatus further includes a filter provided between the amplifier and the high-frequency power measuring unit and adapted to remove harmonics.

In the high-frequency power apparatus according to the above-mentioned aspect, it is preferable that the DC power supply vary the output voltage to change the output level of the DC power.

According to the first aspect of the invention, it is possible to perform control such that the value of high-frequency power supplied to a load is equal to an output power set value and the conversion efficiency of an amplifier from DC power to high-frequency power is made constants. According to the second aspect of the invention, it is possible to perform control such that the value of high-frequency power on a side of the load, which is obtained by subtracting a reflected wave power from a forward wave power, is equal to an output power set value and the conversion efficiency of an amplifier from DC power to high-frequency power is made constant.

The term 'conversion efficiency' means a value obtained by dividing the high-frequency power set value by the measure DC power value. In addition, the DC power supplied from the DC power supply to the amplifier is controlled such that the conversion efficiency is equal to predetermined conversion efficiency. Therefore, unlike the related art, there are no restrictions in performing control such that the output voltage of the amplifier has the maximum amplitude in the range in which the output voltage of the amplifying element, which is a component of the amplifier, is not saturated. Thus, it is possible to further improve the conversion efficiency of the amplifier, as compared with the high-frequency power apparatus according to the related art.

In the above-mentioned aspects of the invention, the output level of the oscillator and the output level of the DC power supply are automatically determined on the basis of the relationship between the output power set value and the efficiency set value. That is, the output level of the DC power supply most suitable for the output power set value is automatically determined. Therefore, unlike the related art, it is unnecessary to previously establish the relationship between the output power set value and the output level of the DC power supply.

Therefore, even when the amplifier of the high-frequency power apparatus according to the invention has the same degree of conversion efficiency as that in the related art, it is possible to reduce the number of operations since it is unnecessary to previously establish the relationship between the output power set value and the output level of the DC power supply. Of course, since the output level of the DC power supply is automatically determined from conversion efficiency lower than the above-mentioned conversion efficiency to conversion efficiency higher than the above-mentioned conversion efficiency, it is possible to achieve a high-frequency power apparatus that is more convenient than the high-frequency power apparatus according to the related art.

According to another aspect of the invention, the high-frequency power apparatus further includes a filter. Therefore, it is possible to remove harmonic components included in the high-frequency power output from the amplifier, and thus to improve the waveform distortion of the high-frequency power. In particular, when the conversion efficiency of the amplifier is higher than that of the high-frequency power apparatus according to the related art, the output level of the DC power supplied from the DC power supply to the amplifier needs to be lowered, and an operational range of the amplifying element, which is a component of the amplifier, needs to be extended to a saturated region so that the output voltage of the amplifying element is saturated. As the conversion efficiency becomes higher, the more distortion occurs in the output waveform of the high-frequency power. When the waveform distortion occurs and a large number of harmonic components exist, the harmonic components have an adverse effect on the process at the load or on the operation of an impedance matching unit of the high frequency power apparatus connected to the load, which may cause a defect to occur in a product, such as a semiconductor wafer or a liquid crystal substrate. Therefore, the filter is very effective. When a small amount of waveform distortion occurs and a small number of harmonic components exist, a defect may not occur in a product although the filter is not provided. In this case, the filter may not be provided in order to reduce manufacturing costs.

BRIEF DESCRIPTION OF THE DRAWINGS

FIGS. 7A to 7D show simulation results of each component when the amplifying circuit shown in FIG. 4 is used.

DETAILED DESCRIPTION OF THE INVENTION

Hereinafter, preferred embodiments of the invention will be described in detail with reference to the accompanying drawings.

FIRST EMBODIMENT

Figure 1:
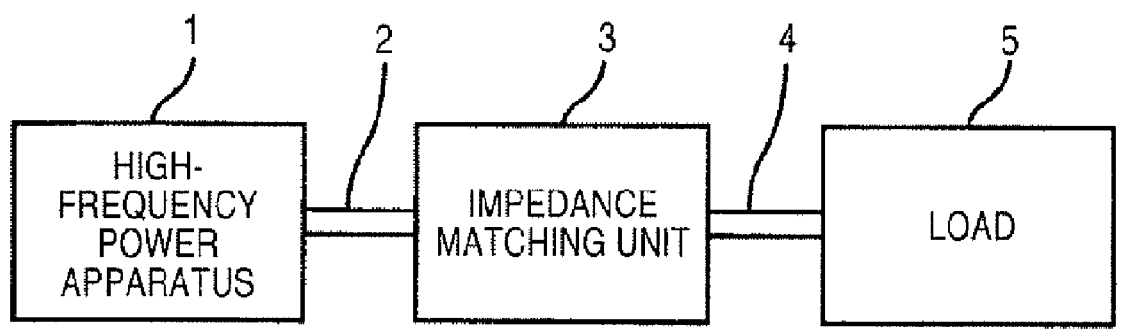
FIG. 1 is a diagram illustrating an example of a high-frequency power apparatus system having a high-frequency power apparatus according to the invention applied thereto.

FIG. 1 is a diagram illustrating an example of a high-frequency power apparatus system having a high-frequency power apparatus according to a first embodiment applied thereto. The high-frequency power apparatus system supplies high-frequency power to an object to be processed, such as a semiconductor wafer or a liquid crystal substrate, to perform processing, such as plasma etching. The high-frequency power apparatus system includes a high-frequency power apparatus 1, transmission lines 2, an impedance matching unit 3, a load connecting unit 4, and a load 5. Alternatively, the high-frequency power apparatus system may not be provided with the impedance matching unit 3.

The high-frequency power apparatus 1 amplifies a high-frequency signal output from an oscillator, which will be described later, by using a power amplifier 14 to output high-frequency power and supplies the high-frequency power to the load 5. In addition, the high-frequency power output from the high-frequency power apparatus 1 is supplied to the load 5 through the transmission line 2 composed of a coaxial cable, the impedance matching unit 3, and the load connecting unit 4 composed of a shielded copper plate. In general, this type of high-frequency power apparatus 1 outputs high-frequency power having a frequency higher than several hundreds of kilohertz.

The impedance matching unit 3 matches the impedance of the high-frequency power apparatus 1 with the impedance of the load 5. More specifically, for example, the impedance of the high-frequency power apparatus 1 when viewed from an output terminal of the high-frequency power apparatus 1 (output impedance) is set to, for example, 50 Ω. When the high-frequency power apparatus 1 is connected to an input terminal of the impedance matching unit 3 in the transmission line 2 having a characteristic impedance of 50 Ω, the impedance matching unit 3 converts the impedance when viewed from the input terminal of the impedance matching unit 3 to the load 5 into 50 Ω.

The load 5 includes a processing unit, and processes an object carried into the processing unit, such as a wafer or a liquid crystal substrate (by etching or a CVD method). In the load 5, in order to process the object, a plasma discharge gas is introduced into the processing unit, and the high-frequency power (voltage) supplied from the high-frequency power apparatus 1 is applied to the plasma discharge gas to discharge the plasma discharge gas, thereby changing the state of the plasma discharge gas from a non-plasma state to a plasma state. Therefore, plasma is used to process the object.

Figure 2:
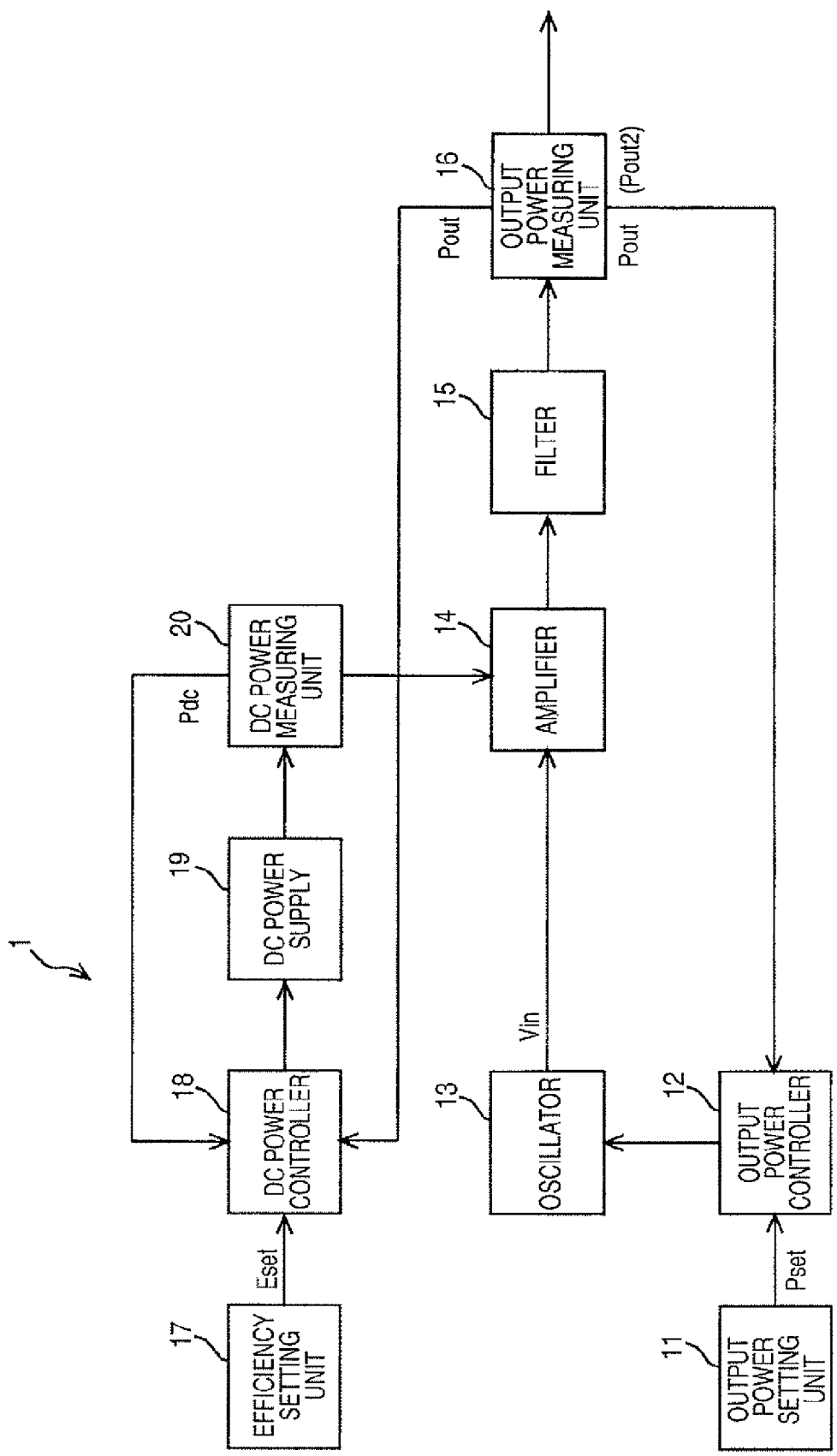
FIG. 2 is a block diagram illustrating the structure of a high-frequency power apparatus 1 according to a first embodiment of the invention.

FIG. 2 is a block diagram illustrating the structure of the high-frequency power apparatus 1 according to the first embodiment of the invention. As shown in FIG. 2, the high-frequency power apparatus 1 includes an output power setting unit 11, an output power controller 12, an oscillator 13, an amplifier 14, a filter 15, an output power measuring unit 16, an efficiency setting unit 17, a direct current (DC) power controller 10, a DC power supply 19, and a DC power measuring unit 20.

The output power setting unit 11 sets an output power value of the high-frequency power supplied to the load 5. Although not shown in FIG. 2, the output power setting unit 11 is provided with, for example, an operating unit including an output power setting switch for setting the output power value of the high-frequency power as a output power set value or an output start switch for instructing the start of the supply of the high-frequency power. An output power set value Pset of the high-frequency power set in the output power setting unit 11 is transmitted to the output power controller 12. Alternatively, the output power set value may be supplied from an external device.

The output power controller 12 compares the output power set value Pset of the high-frequency power set in the output power setting unit 11 with a high-frequency power apparatus measured value Pout measured in the output power measuring unit 16, and controls the output level of an oscillating signal Vin of the oscillator 13 such that these values are equal to each other. That is, the output power controller 12 controls the output level of the oscillating signal Vin of the oscillator 13 such that the output of high-frequency power is kept at a constant level. The output power controller 12 is an example of a first controller of the invention.

The oscillator 13 outputs an alternating current (AC) oscillating signal Vin to the amplifier 14, and the output level of the oscillating signal Vin of the oscillator 13 is controlled on the basis of a control signal from the output power controller 12. The output frequency of the high-frequency power apparatus 1 depends on the oscillating frequency of the oscillator 13. The oscillator 13 is an example of an oscillator of the invention.

The amplifier 14 amplifies the oscillating signal Vin output from the oscillator 13 and outputs high-frequency power. The high-frequency power amplified by the amplifier 14 is supplied to the load 5 through the output power measuring unit 16. The circuit structure of the amplifier 14 will be described later. The amplifier 14 is an example of an amplifier of the invention.

Figure 3:
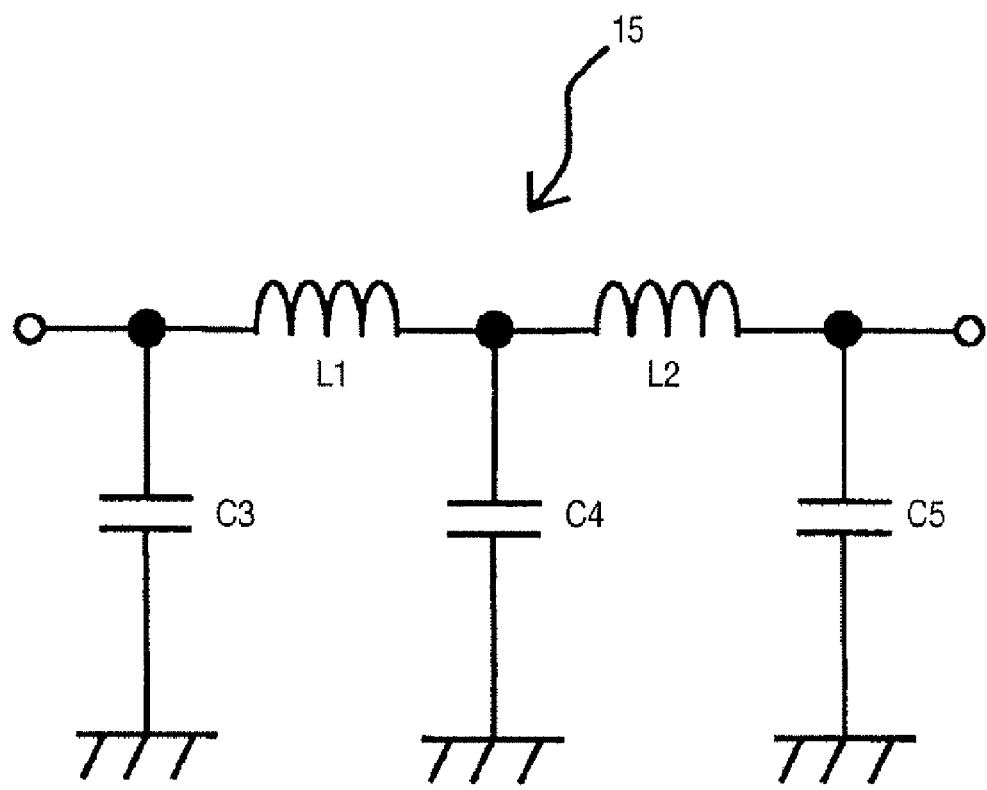
FIG. 3 is a diagram illustrating an example of the circuit structure of a filter 15.

The fitter 15 removes a high frequency included in the output of the amplifier 14. FIG. 3 shows an example of the circuit structure of the filter 15. As shown in FIG. 3, the filter 15 is composed of a low pass filter including inductors L1 and L2 and capacitors C3, C4, and C5. In the filter 15, circuit constants are determined such that a reference output frequency of the amplifier 14 determined by the frequency of the oscillating signal Vin of the oscillator 13 passes through the filter 15, but a frequency higher than the reference output frequency is removed. The filter 15 is an example of a filter of the invention.

The output power measuring unit 16 measures the value of the high-frequency power output from the amplifier 14 at the output terminal of the high-frequency power apparatus 1. For example, the output power measuring unit 16 is composed of a directional coupler and a converting circuit for converting the output of the directional coupler into a power value. The output power measuring unit 16 measures the power value of a frequency traveling from the amplifier 14 to the load 5 (hereinafter, referred to as a forward wave) and outputs the power value as a first high-frequency power measured value Pout corresponding to the power of the forward wave. The output power measuring unit 16 is an example of a high-frequency power measuring unit of the invention.

The first high-frequency power measured value Pout measured in the output power measuring unit 16 is output to the output power controller 12. Then, the output power controller 12 compares the first high-frequency power measured value Pout with the output power set value Pset, as described above, and outputs the control signals to the oscillator 13 such that both the values are equal to each other. In this way, it is possible to control the output of the amplifier 14 to be constant.

Alternatively, the output power measuring unit 16 may measure the first high-frequency power measured value Pout and a second high-frequency power measured value Pout2 corresponding to load-side power obtained by subtracting the power of a reflected wave from the power of the forward wave. Then, the output power measuring unit 16 may output the second high-frequency power measured value Pout2 to the output power controller 12. In this case, the output power controller 12 compares the second high-frequency power measured value Pout2 with the output power set value Pset and outputs the control signal to the oscillator 13 such that both the values are equal to each other. However, in this case, the first high-frequency power measured value Pout, not the second high-frequency power measured value Pout2, is output to the DC power controller 18, which will be described later.

Next, an operation of outputting the first high-frequency power measured value Pout to the output power controller 12 will be described below.

The DC power supply 19 output DC power whose output level varies on the basis of the control signal of the DC power controller 18, which will be described later, and supplies DC power to the amplifier 14 through the DC power measuring unit 20. The DC power supply 19 is an example of a DC power supply of the invention.

The DC power measuring unit 20 measures the value of the DC power supplied to the amplifier 14, and outputs the measured DC power value Pdc to the DC power controller 18, which will be described later. The DC power measuring unit 20 is an example of a DC power measuring unit of the invention.

The DC power controller 18 receives an efficiency set value Eset set by the efficiency setting unit 17, the high-frequency power measured value Pout output from the output power measuring unit 16, and the DC power measured value Pdc output from the DC power measuring unit 20, and outputs a control signal for controlling the output of the DC power supply 19 such that a value obtained by dividing the high-frequency power measured value Pout by the DC power measured value Pdc (=the high-frequency power measured value Pout/the DC power measured value Pdc) is equal to the efficiency set value Eset. In this way, the DC power supply 19 can control the conversion efficiency of the amplifier 14 from DC power into high-frequency power to be constant. The DC power controller 18 is an example of a second controller of the invention.

Next, the operation of the invention will be described with reference to the circuit of the amplifier 14.

Figure 4:
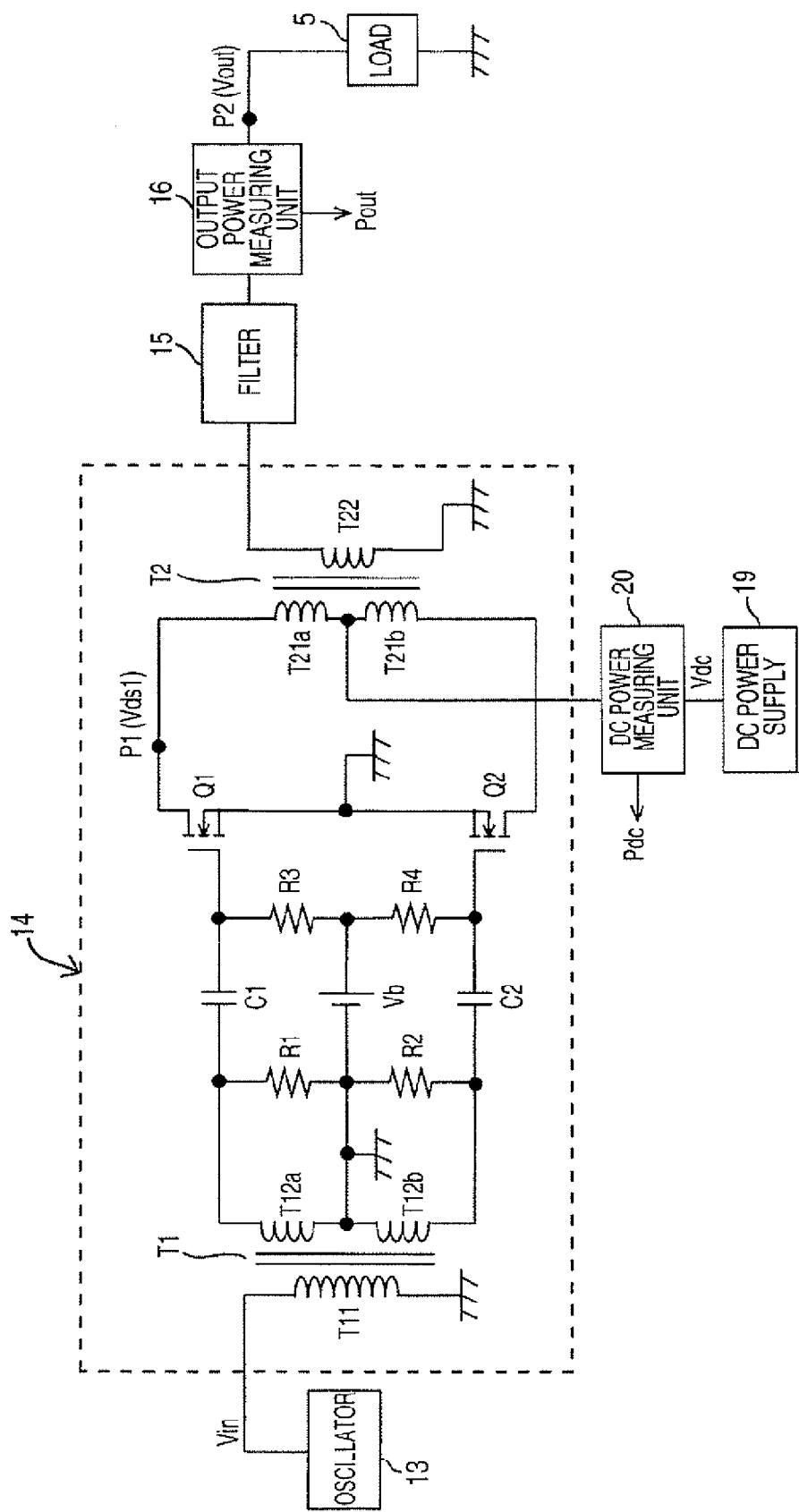
FIG. 4 is a diagram illustrating the structure of a push-pull amplifying circuit using FETs, which is an example of an amplifier 14, and the connection relationship between an oscillator 13 and the amplifier 14.

FIG. 4 is a diagram illustrating the structure of a push-pull amplifying circuit using FETs, which is an example of the amplifier 14, and the connection relationship between the oscillator 13 and the amplifier 14, The amplifier 14 shown in FIG. 4 is formed of a so-called push-pull circuit, and includes a first transformer T1 having a secondary coil that is divided into one coil T12*a* and the other coil T12*b*, first and second amplifying elements Q1 and Q2 composed of, for example, FETs, a second transformer T2 having a primary coil that is divided into one coil T21*a* and the other coil T21*b*, resistors R1 to R4, capacitors C1 and C2, and a driving voltage supplying circuit composed of a DC power source Vb. The first and second amplifying elements Q1 and Q2 may be composed of, for example, bipolar transistors, instead of the FETs.

Since the push-pull circuit is well known, the operation thereof will be briefly described below.

When the oscillating signal Vin (AC voltage) output from the oscillator 13 is input to the primary coil T11 of the first transformer T1, voltages having reverse phases are generated from the one coil T12*a* and the other coil T12*b* of the second coil of the first transformer T1. These voltages causes the first and second amplifying elements Q1 and Q2 to be alternately turned on and off every half period, and the on or off operations are repeatedly performed.

Since a DC power supply voltage Vdc generated by the DC power supply 19 is supplied between the one coil T21*a* and the other coil T21*b* of the primary coil of the second transformer T2, the output voltages (voltage between a drain and a source) of the first and second amplifying elements Q1 and Q2 are induced to the primary coil of the second transformer T2 as a voltage with the DC power supply voltage Vdc at the center of the amplitude waveform thereof (see a voltage Vds shown in FIG. 7B, which will be described later).

AC power corresponding to the high-frequency power is induced to the secondary coil of the second transformer T2. The high-frequency power is supplied to the load 5 through the filter 15 and the output power measuring unit 16. At that time, a high frequency is removed by the filter 15, and thus waveform distortion is improved (see a voltage Vout shown in FIG. 7A, which will be described below).

Figure 5:
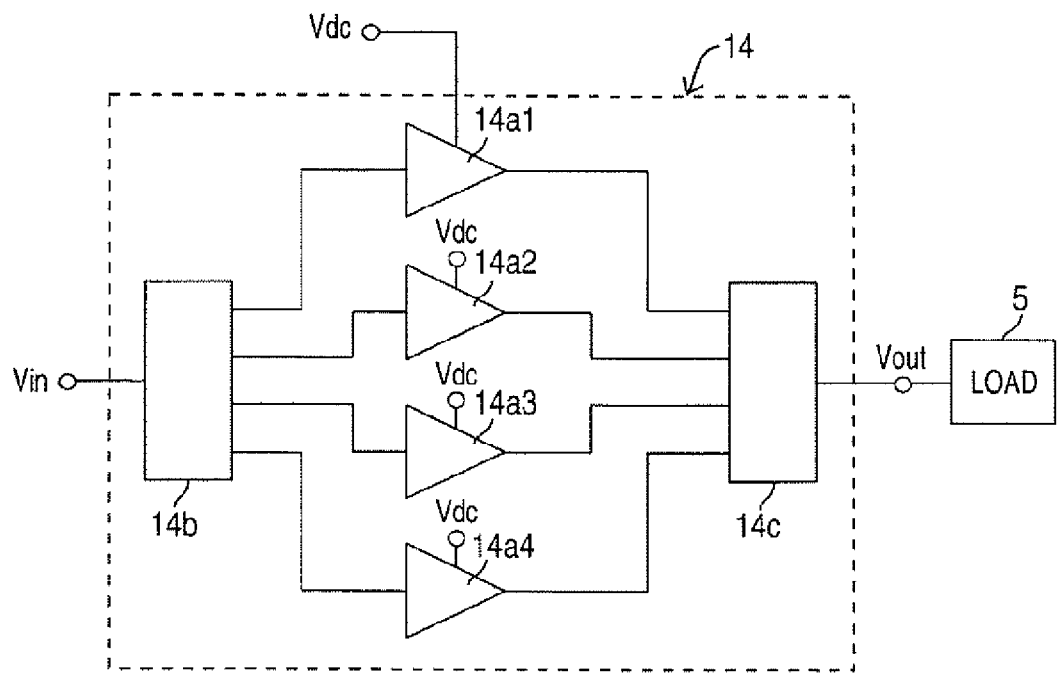
FIG. 5 is a diagram illustrating an example of the structure of an amplifier using a plurality of amplifying circuits.

FIG. 5 is a diagram illustrating an example of the structure of an amplifier using a plurality of amplifying circuits.

In FIG. 4, an amplifier is composed of one amplifier. However, as shown in FIG. 5, an amplifier may be composed of a plurality of amplifiers.

In this structure, the amplifier 14 includes a plurality of amplifiers 14*a*1 to 14*a*4 that operates by the DC power supply voltage Vdc of the DC power supply 19 (not shown), a power distributor 14*b* that divides a high-frequency signal Vin supplied from the oscillator 13 (not shown) and outputs the divided high-frequency signals to the amplifiers 14*a*1 to 14*a*4, a power synthesizer 14*c* that synthesizes outputs from the amplifiers 14*a*1 to 14*a*4 and supplies the synthesized output to the load 5.

The filter 15 and the output power measuring unit 16 are not shown in FIG. 5. When an inductor or a capacitor is used for the power synthesizer 14*c*, the power synthesizer 14*c* may be provided with a function of attenuating harmonics to the power synthesizer 14*c*. In this case, the amplifier 14 can have the function of a filter.

Figure 6:
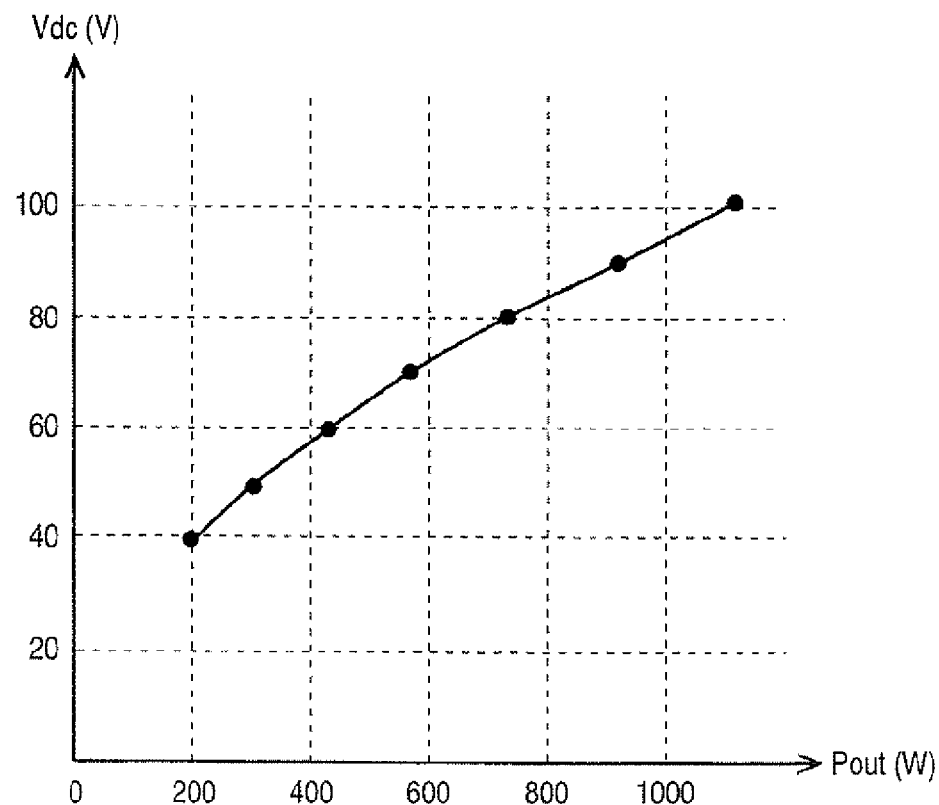
FIG. 6 is a characteristic diagram illustrating the relationship between a high-frequency power measured value Pout and a DC power supply voltage Vdc when the amplifying circuit shown in FIG. 4 is used.

FIG. 6 is a graph illustrating the characteristics of the DC power supply voltage Vdc with respect to the high-frequency power measured value Pout when the amplifying circuit shown in FIG. 4 is used. More specifically, FIG. 6 shows the relationship between the high-frequency power measured value Pout and the DC power supply voltage Vdc when the efficiency set value Eset is set to 85%.

As described above, in the high-frequency power apparatus according to this embodiment of the invention, the output power controller 12 varies the output level of the oscillating signal Vin output from the oscillator 13 such that the high-frequency power measured value Pout is equal to the output power set value Pset. In addition, the DC power controller 18 performs control such that the conversion efficiency (=the high-frequency power measured value Pout/ the DC power measured value Pdc) is equal to the efficiency set value Eset. Therefore, the output level of the oscillator 13 and the output level of the DC power supply voltage Vdc are automatically determined on the basis of the relationship between the output power set value Pset and the efficiency set value Eset. As a result, the characteristic diagram shown in FIG. 6 is obtained.

Therefore, unlike the related art, the characteristic function or the characteristic graph of the DC power supply voltage Vdc with respect to the output power set value Pset is not previously calculated, but the optimum DC power supply voltage Vdc is automatically calculated. Therefore, even if the high-frequency power apparatus is used with the same degree of conversion efficiency as that in the related art, it is unnecessary to calculate the characteristic graph or the characteristic function beforehand, which makes it possible to reduce the number of manufacturing processes. Of course, since the optimum DC power supply voltage Vdc is calculated in the range of lower conversion efficiency to higher conversion efficiency than that in the related art, it is possible to provide a high-frequency power apparatus that is more convenient than the high-frequency power apparatus according to the related art.

FIGS. 7A to 7D are diagrams illustrating simulation results of each component when the amplifying circuit shown in FIG. 4 is used. The simulation is performed under the following conditions: the output frequency of the amplifier 13 is 10 MHz; conversion efficiency=85%; and the high-frequency power measured value Pout=1110 W. FIG. 7A shows a voltage Vout at the output terminal (a point P2 of FIG. 4) of the output power measuring unit 16. FIG. 7B shows the DC power supply voltage Vdc of the DC power supply 19 for supplying DC power to the amplifying circuit and an output voltage Vds1 (a voltage Vds1 at a point P1 of FIG. 4) of an amplifying element, which is a component of the amplifier. FIG. 7C shows power Pout at the output terminal (the point P2 of FIG. 4) of the output power measuring unit 16 and the DC power measured value Pdc measured by the DC power measuring unit 20. FIG. 7D shows a value Pout/Pdc.

When the efficiency set value Eset is set to 85%, as shown in FIG. 6, the output level of the oscillating signal Vin output from the oscillator 13 and the output level of the DC power supply voltage Vdc are automatically determined on the basis of the relationship between the output power set value Pset and the efficiency set value Eset. In addition, as shown in FIGS. 7C and 7D, the conversion efficiency represented by (Pout/Pdc)*100 is set to 85%.

When the conversion efficiency is set to be higher than 78%, which is the maximum conversion efficiency in the related art, an amplifying element (for example, an FET), which is a component of the amplifier 14, is used in a saturated region. Therefore, as shown in FIG. 7B, the output voltage Vds1 of the amplifying element does not have a sine waveform at the point P1 of FIG. 4, that is, the upper part and the lower part of the waveform of the output voltage Vds1 are cut, resulting in waveform distortion. Therefore, distortion also occurs in the output voltage of the amplifier 14, and thus the output voltage of the amplifier 14 includes a large number of harmonic components. However, since the filter 15 is provided in the rear stage of the amplifier 14, the waveform of the amplifier 14 is improved, as shown In FIG. 7A, and thus the amplifier 14 car output a voltage having a waveform substantially similar to a sine wave. When the conversion efficiency is set to 85%, the output voltage Vds1 of the amplifying element does not have a sine waveform, but loss is reduced. That is, according to this embodiment, it is possible to further improve the conversion efficiency, as compared with the high-frequency power apparatus according to the related art.

SECOND EMBODIMENT

Figure 8:
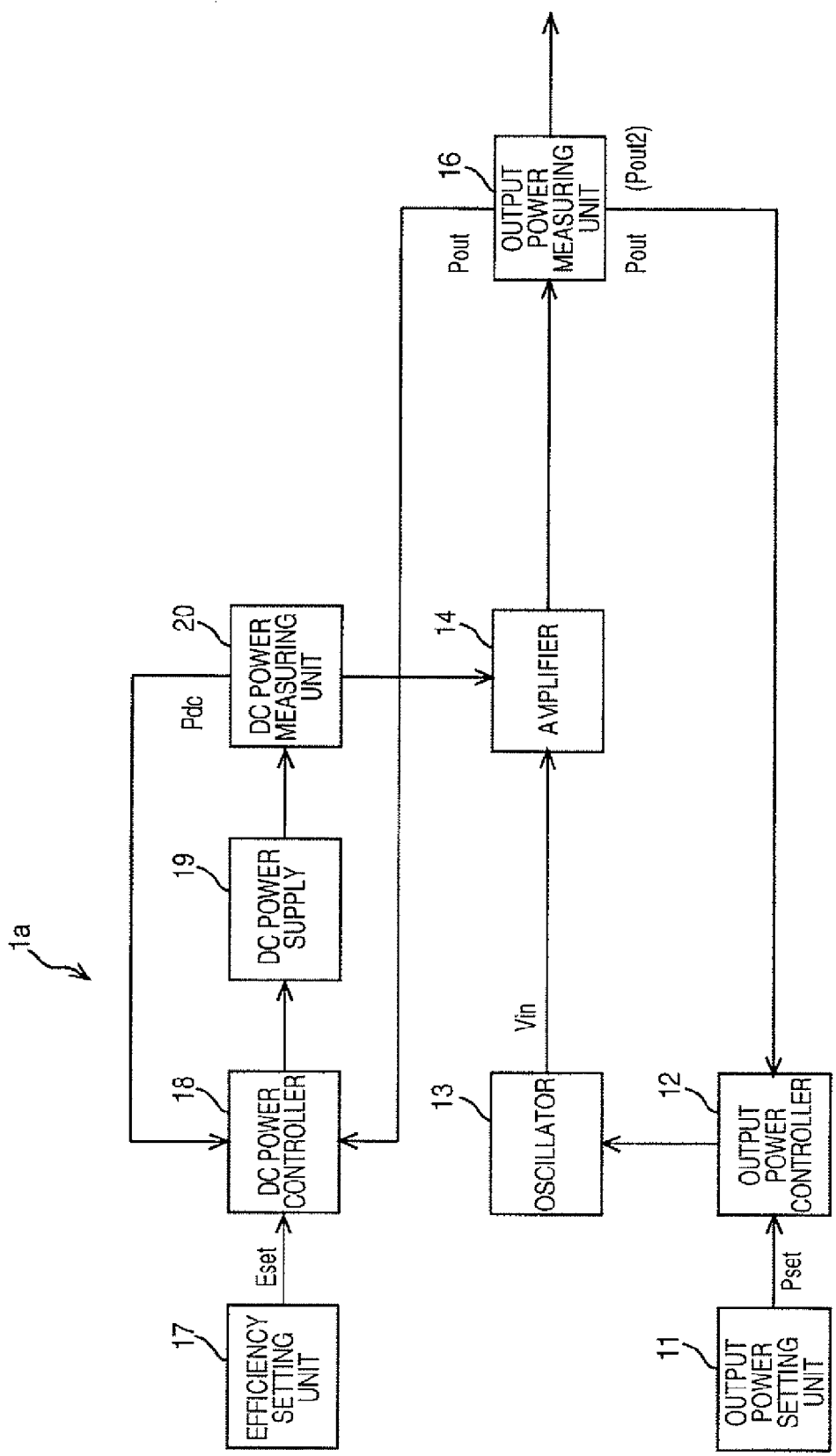
FIG. 8 is a block diagram illustrating the structure of a high-frequency power apparatus system having a high-frequency power apparatus 1a according to a second embodiment of the invention applied thereto.
Figure 9:
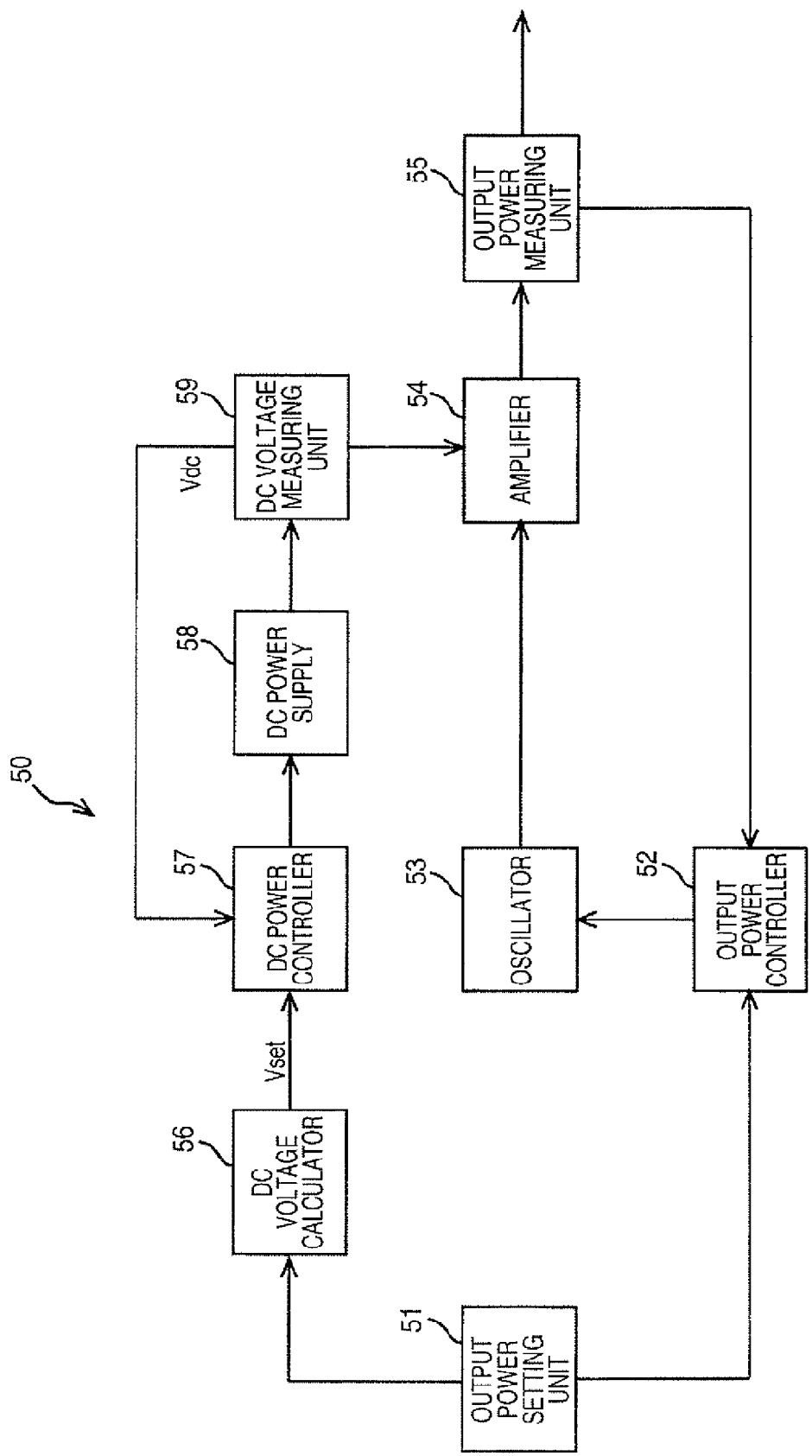
FIG. 9 is a block diagram illustrating the structure of a high-frequency power apparatus 50 according to the related art disclosed in JP-A-2001-197749.
Figure 10A:
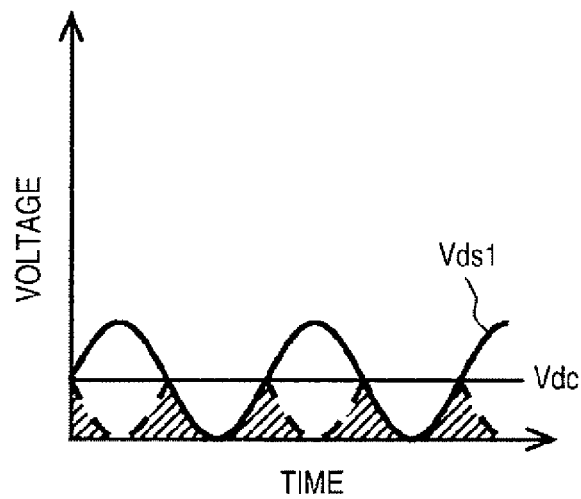
FIGS. 10A to 10C are diagrams illustrating an output voltage Vds1 of an amplifying element, which is a component of an amplifier, and a DC power supply voltage Vdc when the high-frequency power apparatus 50 according to the related art is used.
Figure 10B:
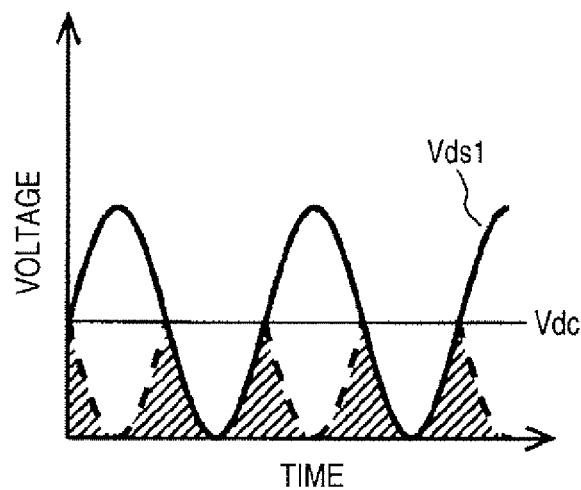
Figure 10C:
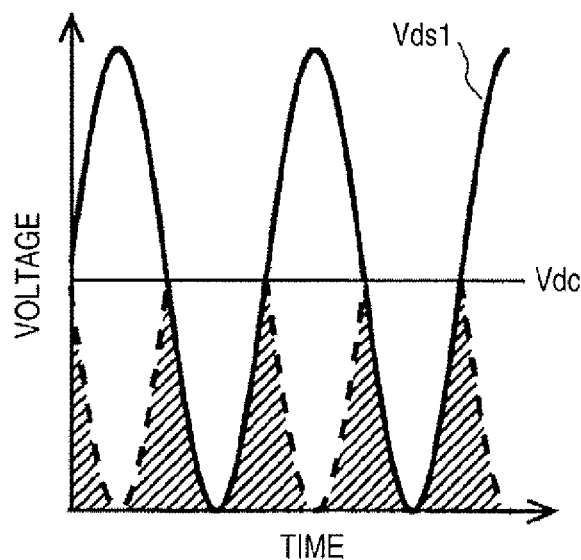

FIG. 8 is a block diagram illustrating an example of a high-frequency power apparatus system having a high-frequency power apparatus 1a according to a second embodiment of the invention applied thereto.

The high-frequency power apparatus system shown in FIG. 8 is similar to the high-frequency power apparatus system shown in FIG. 2 except that the filter is not provided. Therefore, in this embodiment, a description of the same components as those in the first embodiment will be omitted.

As described in the first embodiment, when the conversion efficiency is set to a high level, the output voltage Vds1 of the amplifying element is saturated. In this state, since distortion occurs in the output waveform of the amplifier 14, the filter 15 needs to be used to improve the waveform. However, when the conversion efficiency is set in the range in which the output voltage Vds1 of the amplifying element is not saturated, no distortion occurs in the output waveform of the amplifier 14, which makes it unnecessary to use the filter 15 to improve the waveform.

More specifically, as described in Background Art, when the conversion efficiency is lower than about 78%, waveform distortion does not occur. Therefore, in this case, the filter 15 may not be used.

However, even though the conversion efficiency is lower than about 78%, it is necessary to use the filter 15 to remove harmonics (which are mainly generated due to the switching of an FET) generated from the amplifier 14, when the harmonics have a great effect on the system.

It should be understood that the scope of the invention is not limited to the above-described embodiments. For example, in the first and second embodiments, the push-pull circuit is used as a circuit forming the amplifier, but the invention can be applied to a full-bridge amplifying circuit or a half-bridge amplifying circuit.

What is claimed is:

1. A high-frequency power apparatus comprising:
   an oscillator, outputting an oscillating signal, an output level of the oscillating signal being variable;
   an amplifier, amplifying the oscillating signal output from the oscillator and outputting high-frequency power;
   a DC power supply, supplying DC power to the amplifier, an output level of the DC power being variable;
   a high-frequency power measuring unit, measuring a power value of the high-frequency power at an output terminal of the high-frequency power apparatus and outputting the measured power value as a high-frequency power measured value;
   a DC power measuring unit, measuring a power value of the DC power supplied to the amplifier and outputting the measured DC power value as a DC power measured value;
   a first controller, controlling the output level of the oscillating signal to be output from the oscillator such that the high-frequency power measured value is substantially equal to an output power set value; and
   a second controller, controlling the output level of the DC power to be supplied from the DC power supply to the amplifier such that a calculated value obtained by dividing the high-frequency power measured value by the DC power measured value is substantially equal to a predetermined efficiency set value.

2. The high-frequency power apparatus according to claim 1, further comprising:
   a filter, provided between the amplifier and the high-frequency power measuring unit and adapted to remove harmonics.

3. The high-frequency power apparatus according to claim 1, wherein the DC power supply varies an output voltage to change the output level of the DC power.

4. A high-frequency power apparatus comprising:
   an oscillator, outputting an oscillating signal, an output level of the oscillating signal being variable;
   an amplifier, amplifying the oscillating signal output from the oscillator and outputting high-frequency power;
   a DC power supply, supplying DC power to the amplifier, an output level of the DC power being variable;
   a high-frequency power measuring unit,
      measuring a power value of the high-frequency power at an output terminal of the high-frequency power apparatus and outputting the measured power value as a first high-frequency power measured value and
      measuring a power value of a high-frequency power corresponding to power on a side of a load obtained by subtracting a reflected wave power from a forward wave power and outputting the measured power value as a second high frequency power measured value;
   a DC power measuring unit, measuring a power value of the DC power supplied to the amplifier and outputting the measured DC power value as a DC power measured value;
   a first controller, controlling the output level of the oscillating signal to be output from the oscillator such that the second high-frequency power measured value is substantially equal to an output power set value; and
   a second controller, controlling the output level of the DC power to be supplied from the DC power supply to the amplifier such that a calculated value obtained by dividing the first high-frequency power measured value by the DC power measured value is substantially equal to a predetermined efficiency set value.

5. The high-frequency power apparatus according to claim 4, further comprising:
   a filter, provided between the amplifier and the high-frequency power measuring unit and adapted to remove harmonics.

6. The high-frequency power apparatus according to claim 4, wherein the DC power supply varies an output voltage to change the output level of the DC power.

* * * * *

UNITED STATES PATENT AND TRADEMARK OFFICE
CERTIFICATE OF CORRECTION

| | |
|---|---|
| PATENT NO. | : 7,265,528 B2 |
| APPLICATION NO. | : 11/467229 |
| DATED | : September 4, 2007 |
| INVENTOR(S) | : H. Kotani et al. |

It is certified that error appears in the above-identified patent and that said Letters Patent is hereby corrected as shown below:

At column 12, line 32 (claim 4, line 12) of the printed patent, after "value", insert -- ; --.

Signed and Sealed this

Seventeenth Day of June, 2008

JON W. DUDAS
*Director of the United States Patent and Trademark Office*